United States Patent [19]
Zittel

[11] Patent Number: 5,587,073
[45] Date of Patent: Dec. 24, 1996

[54] END SUPPORTED DOUBLE DRUM WASTE WATER SCREEN

[76] Inventor: David R. Zittel, 155 Oak Grove Dr., Columbus, Wis. 53925

[21] Appl. No.: 477,085

[22] Filed: Jun. 7, 1995

Related U.S. Application Data

[63] Continuation of Ser. No. 121,730, Sep. 15, 1993, Pat. No. 5,433,849.

[51] Int. Cl.$^6$ .................... B01D 33/067; B01D 33/11; B01D 33/42; B01D 33/72
[52] U.S. Cl. .................... 210/372; 210/377; 210/324; 210/327; 210/338; 210/342; 210/380.3; 210/396; 210/403; 209/290; 209/291
[58] Field of Search .................... 210/337, 338, 210/377, 380.3, 396, 403, 404, 456, 784, 323.2, 342, 324, 326, 327, 372; 209/290, 291

[56] References Cited

U.S. PATENT DOCUMENTS

| | | |
|---|---|---|
| 1,236,256 | 8/1917 | Brace . |
| 1,254,160 | 1/1918 | Souza . |
| 1,270,422 | 6/1918 | Lindquist . |
| 1,287,238 | 8/1921 | Cave . |
| 1,596,428 | 8/1926 | Greene . |
| 1,712,258 | 5/1929 | Compain . |
| 1,845,893 | 2/1932 | Sommermeyer . |
| 2,732,073 | 1/1956 | Ruegg . |
| 2,748,951 | 6/1956 | Dubach . |
| 2,929,504 | 3/1960 | Lind et al. .................... 210/158 |
| 3,750,885 | 8/1973 | Fournier .................... 210/107 |
| 3,752,319 | 8/1973 | Richter .................... 210/357 |

(List continued on next page.)

FOREIGN PATENT DOCUMENTS

| | | |
|---|---|---|
| 510056 | 4/1952 | Belgium . |
| 704050 | 2/1965 | Canada . |
| 461332 | 5/1928 | Germany . |
| 467211 | 10/1928 | Germany . |
| 1427413 | 11/1970 | Germany . |
| 55-70318 | 5/1980 | Japan . |
| 61-287410 | 12/1986 | Japan . |
| 613816 | 7/1978 | U.S.S.R. . |
| 6536 | 1/1903 | United Kingdom . |
| 2176423 | 12/1986 | United Kingdom . |
| 88/6479 | 9/1988 | WIPO . |

OTHER PUBLICATIONS

Rotary Drum Screens/Reduce Solids, BOD, FOG, Lyco Manufacturing, Columbus, Wisconsin.
Sani–Matic Ecology/Industrial Rotary Drum Strainer, Sani–Matic Systems, Madison, Wisconsin.
Stationary Screens, Lyco Manufacturing, Inc., Columbus, Wisconsin.
Follow the flow . . . in four steps, p. 4–5, Hycore Corp., Lake Bluff, Illinois.

Primary Examiner—Thomas M. Lithgow
Attorney, Agent, or Firm—Lathrop & Clark

[57] ABSTRACT

An interior wedge wire drum screen is mounted wholly within an exterior drum screen of narrower wedge wire spacing, and both are mounted to a frame and caused to rotate about a common central axis. One end of the outer drum is open and the other is closed by a disc-shaped drum head. The inner drum has an open end which is spaced inward of the open end of the outer drum. The waste water is presented to the surface of the inner drum screen by a waste water infeed which employs a vertical column. The column extends upwardly of an inlet and has a gradually increasing cross-section for reducing the flow of velocity of the waste water. A horizontal trough extends along the axis defined by the drums and communicates between the top of the column and a tray. The edges of the tray terminate in weirs which are parallel to the sides of the inner drum. Water flows in a smooth sheet over a weir to impact the sides of the inner screen with low velocity. As the drums rotate the accumulating residue is moved by a spiral auger which progresses the filtered material to the open ends of the drums. The material from the inner drum falls to the surface of the outer drum, and is progressed to a waste collection trough.

11 Claims, 2 Drawing Sheets

U.S. PATENT DOCUMENTS

| | | | |
|---|---|---|---|
| 3,756,406 | 9/1973 | Khan . | |
| 4,012,323 | 3/1977 | Babunovic | 210/407 |
| 4,236,999 | 12/1980 | Burgess et al. | 209/250 |
| 4,278,543 | 7/1981 | Maniquis | 210/403 |
| 4,306,975 | 12/1981 | Siewert | 210/394 |
| 4,368,125 | 1/1983 | Murray | 210/403 |
| 4,507,202 | 3/1985 | Nord et al. | 210/391 |
| 4,512,956 | 4/1985 | Robinson et al. | 422/270 |
| 4,597,865 | 7/1986 | Hunt et al. | 210/179 |
| 4,724,077 | 2/1988 | Uchiyama | 210/394 |
| 4,911,828 | 3/1990 | Musselmann et al. | 209/273 |
| 4,997,558 | 3/1991 | Baker | 210/143 |
| 5,019,248 | 5/1991 | Kaldor | 209/240 |
| 5,030,348 | 7/1991 | Bengt | 210/374 |
| 5,041,223 | 8/1991 | Johansson et al. | 210/403 |

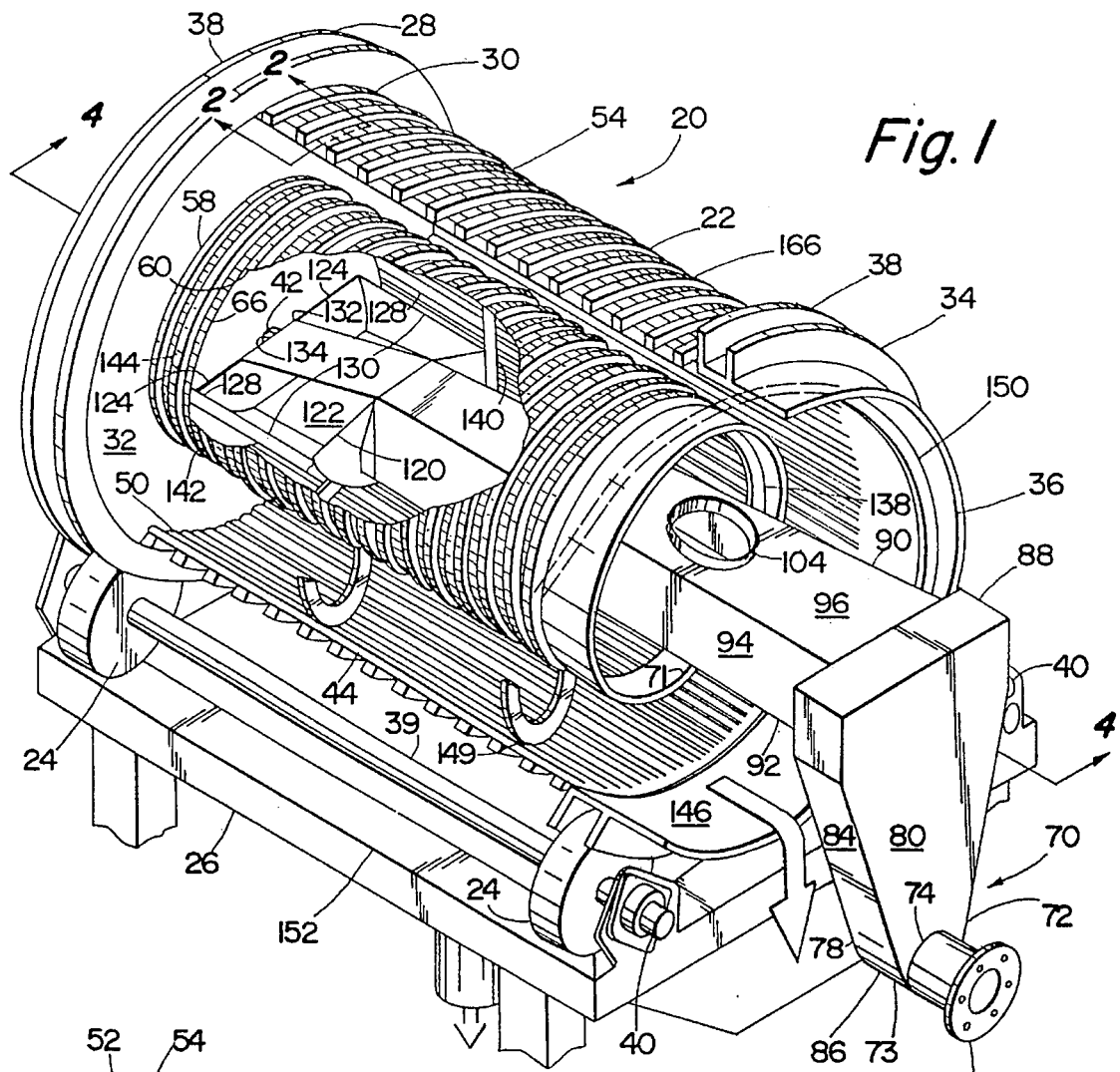
Fig. 1
Fig. 2
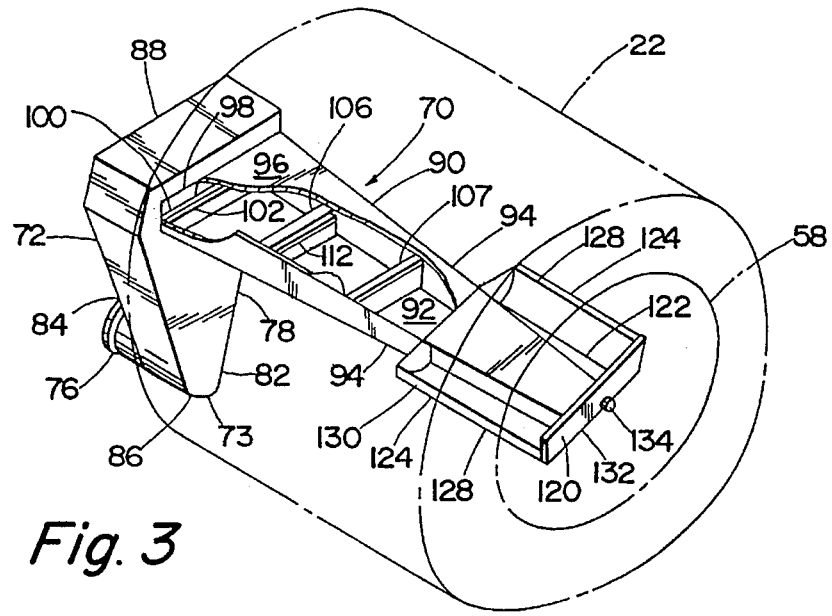
Fig. 3

END SUPPORTED DOUBLE DRUM WASTE WATER SCREEN

This application is a continuation of U.S. patent application Ser. No. 08/121,730, filed Sep. 15, 1993, now U.S. Pat. No. 5,433,849.

FIELD OF THE INVENTION

This invention relates to waste water screens in general and to rotating drum waste water screens in particular.

BACKGROUND OF THE INVENTION

In the food processing industry, large quantities of water are utilized to wash, clean and move processing debris from agricultural products as they are prepared for consumption. Waste water is commonly disposed of in two ways, by recycling and reusing the water, or by disposing of the water by applying it as irrigation water to crop land.

Water may be recycled where water is used to separate processing debris from a desired food product. In these cases, if the water is cleaned of debris, it may be recycled to pick up additional debris from processed plant materials. Wash water is often used in a counter-flow arrangement. Fresh water is used to perform the final rinse on an agricultural commodity whereupon it is filtered and reused for intermediate washing steps. Finally, the wash water is utilized for the initial or first wash, whereupon, after filtering, it is pumped to an irrigation system for application to the fields.

After each use of the water, it is imperative that as much debris be removed as quickly and simply as possible from the waste water stream so that it may be recycled multiple times and the total wash water kept to a minimum. Further, in order to prevent the clogging of the irrigation system used to apply the waste water to agricultural land, it is imperative that the suspended materials above a given size be removed from the waste water before it enters the irrigation piping system.

The optimal waste water treatment system should pass large amounts of water while at the same time removing all or nearly all of the suspended material above a given size. Two problems complicate the design of waste water screens. One is the removal of the residue from the screen. The other is clogging of the screen with the residue. A solution to the second problem has generally been found in the employment of wedge wire as opposed to ordinary wire in the manufacture of screens. Wedge wire, as the name implies, is wire with a wedge-like cross-section of a truncated triangle. The bases of the triangles form the filtering surface. Thus any waste which passes the exterior surface of the wedge wire screen experiences increasing clearance between the adjacent sides of the wedge wires, thus passing freely through the screen. A conventional screen employing round wires has a minimum clearance in the middle of the screen, As the round wires form outwardly-facing and inwardly-facing wedged openings, the outwardly-facing openings tend to collect waste material which becomes wedged therebetween.

For the removal of the residue or waste solids, a number of techniques have been employed. One typical technique is to form the filter screen into a drum. Spaced within the drum is a waste water feed employing overflowing weirs which present the waste water to the screen as a narrow curtain of water parallel to the axis of rotation of the drum. Rotation of the drums serves two purposes. First, a constantly fresh section of the screen is presented to the stream of waste water. Second, the rotational action of the drum causes the solids or waste to tumble and agglomerate. The agglomerated material may then be moved by a series of diverters or a single, continuous diverter which is arranged in a spiral pattern and continuously moves solids to the drum end for removal. The smooth flow of water onto the screen surfaces is highly desirable. However, turbulent flows or agitated water flows of conventional filters hamper this end.

The natural distribution of waste particles in wash water includes smaller particles, which tend to be more numerous and larger particles which generally contain the bulk of the material entrained in the waste water. It has been found that the overall speed of water filtration can be improved by using two filters in sequence, first a coarse filter which removes the majority of the volume of suspended material, and then a fine filter which removes the more numerous but finer particles. The use of two filters, however, has the undesirable effect of doubling the amount of equipment required.

What is needed is a waste water filter which effectively filters water with minimal clogging and with two progressive filters in a single machine.

SUMMARY OF THE INVENTION

The waste water screen of this invention employs two drum screens, one wholly mounted within the other. The drums are joined at one end and caused to rotate about a common central axis. Both drum screens are constructed of axially extending wedge wires which are held in position and spaced apart by circumferential exterior bands. The spacing between the wedge wires composing this screen of the inner drum is 0.060 inches. The outer drum is composed of smaller wedge wires which have a gap of 0.010 inches. The outer drum is mounted on steel tires which ride on trunions. The trunions are fixed to axles rotatably mounted to a frame. At least one of the trunions is driven to rotate the connected drums. Positioned beneath the frame is a waste water collection tray in which the waste water is collected. One end of the outer drum is open and the other is closed by a disc-shaped drum head. The inner drum is mounted to the drum head, which serves to close one end of the inner drum. The inner drum terminates at an open end which is spaced inward of the open end of the outer drum. The open ends of the inner and outer drums terminate in short, circumferential sections which are impervious and are constructed of cylindrical sections of stainless steel. The open end of the inner drum extends to slightly overlap the impervious end section of the outer drum.

For optimal functioning of the drum screen the waste water should be presented to the surface of the inner drum screen uniformly, and with minimal velocity. This is accomplished by a waste water infeed which employs a vertical column having an inlet for waste water at the bottom and an outlet at the top. The column extends upwardly from the inlet and has a gradually increasing cross-section for reducing the flow velocity of the waste water. A horizontal trough extends along the axis defined by the inner and outer drums from the top of the column. The waste water is discharged from the vertical column over a weir or dam in the side of the column and flows into the trough. The trough has transverse baffles which extend perpendicular to the axis of the drum. The baffles are spaced from the bottom and the top of the trough, and have transverse slots. The baffles smooth the flow of water in to a tray with open sides. The edges of the tray terminate in upraised lips which define weirs which are parallel to the sides of the inner drum, over which weirs the waste water flows in a smooth sheet to uniformly impact the sides of the inner screen with low velocity. The low velocity and narrow uniform presentation of the waste water assures that material is not jammed between the wedge wires of the inner screen and that each portion of water is presented with a uniform amount of clean screen area which promotes rapid and uniform filtering.

As the inner screen drum rotates, the accumulating residue is moved by a spiral which forms an Archimedes-type screw which progresses the filtered material to the end of the inner drum, where it moves on to the impervious section of the drum and cascades down to the lower drum impervious section. The filtered water progresses through the inner screen and is presented to the outer screen, whereupon particles which could pass the inner screen but not the outer screen accumulate. The inner drum residue together with the outer drum residue are progressed by an auger or screw which extends the length of the outer drum to the outlet of the outer drum to a waste collection tray.

It is an object of the present invention to provide a drum screen which allows a higher through-put of waste water.

It is another object of the present invention to provide a drum screen which provides progressive filtration of waste water.

It is a further object of the present invention to provide a waste water feed of improved flow uniformity for use with a drum screen.

It is yet another object of the present invention to provide a waste water screen which provides a single infeed for water, a single outfeed for water, a single outfeed for waste, and yet provides two-stage filtration.

Further objects, features and advantages of the invention will be apparent from the following detailed description when taken in conjunction with the accompanying drawings.

BRIEF DESCRIPTION OF THE DRAWINGS

FIG. 1 is an isometric view, partly cut away, of the double drum waste water screen of this invention.

FIG. 2 is a fragmentary cross-sectional view of the apparatus of FIG. 1 taken along section line 2—2.

FIG. 3 is an isometric view looking towards the waste water in-feed end of the waste water infeed of the apparatus of FIG. 1, with the inner and outer drum perimeters indicated in phantom view.

DESCRIPTION OF THE PREFERRED EMBODIMENT

Figure 4:
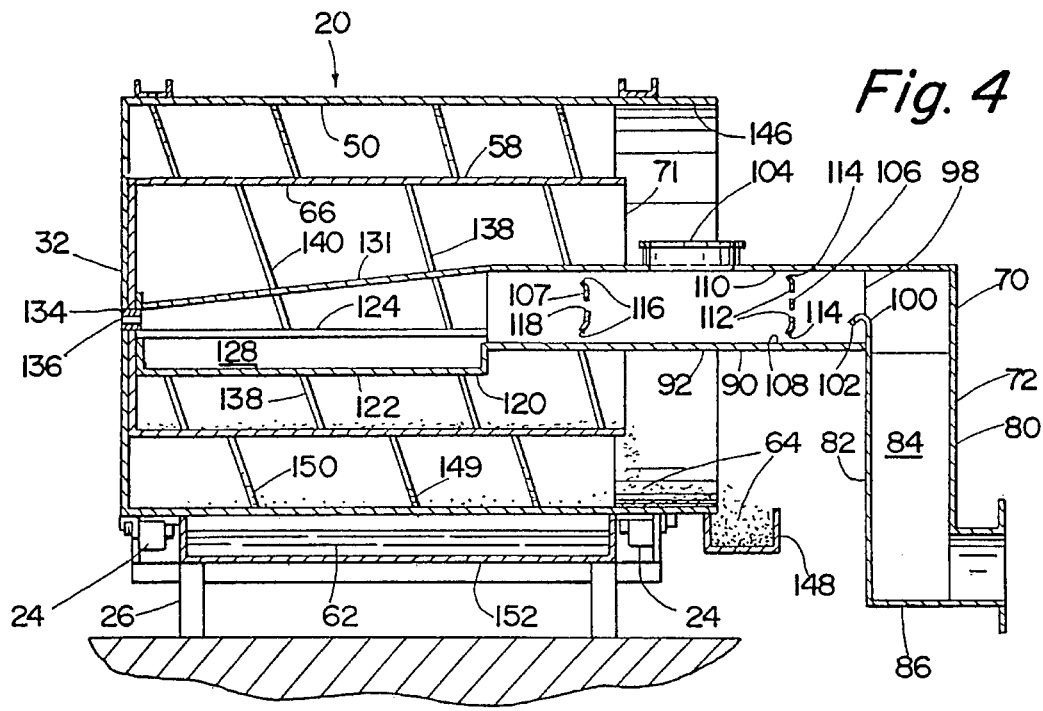
FIG. 4 a cross-sectional view of the apparatus of FIG. 1 taken along section line 4—4.
Figure 5:
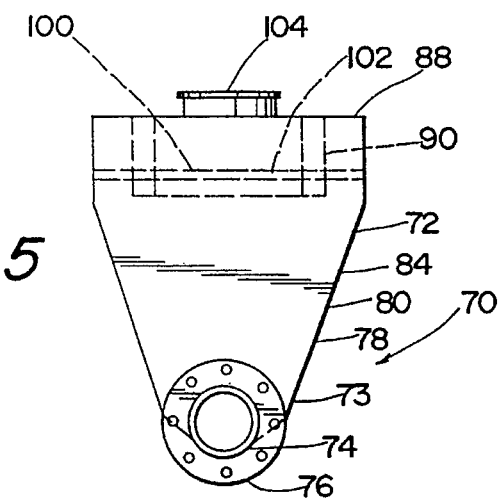
FIG. 5 is an inlet end elevational view of the waste water infeed of FIG. 3.
Figure 6:
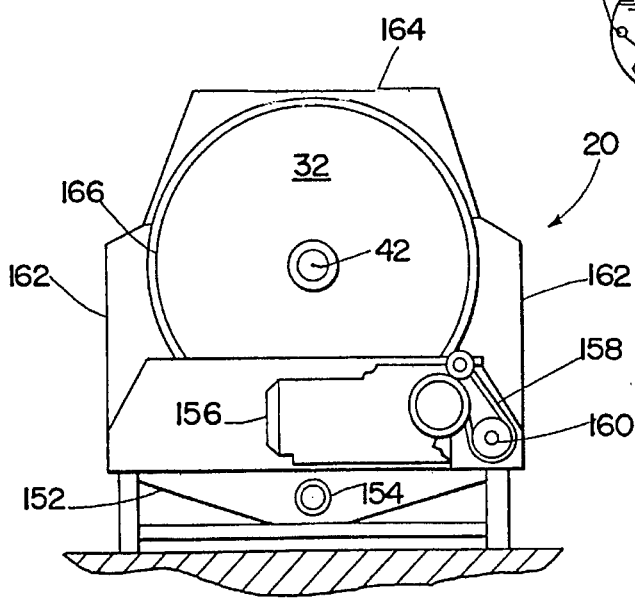
FIG. 6 is an end elevational view of the apparatus of FIG. 1, partly broken away to show the drum drive.

Referring more particularly to FIGS. 1–8, wherein like numbers refer to similar parts, a double drum waste water screen 20 is shown in FIGS. 1, 4 and 6, which may be used to remove suspended material from waste water.

The double drum screen 20 has an inner drum 58 which is connected to an outer drum 22 which is mounted for rotation on trunions 24 which are mounted to a frame 26. The outer drum 22 has a rear tire 28 which surrounds the circumference of the outer drum 22 at a first end 30, which is closed by a disc-shaped drum head 32. A forward tire 34 is spaced inward of a second, open, end 36 of the outer drum 22. The tires are formed of outwardly opening U-shaped channels 38 in which the trunions 24 ride. Four trunions 24 are employed, two on each of two trunion axles 39. The axles 38 are mounted in trunion axle bearings 40 to the frame 26. As shown in FIG. 6, a gear motor 156 is connected by means of a chain drive 158 to the driven trunion axle 160. This causes the connected drums 22, 58 to rotate by driving two of the trunions 24 on one side of the outer drum 22.

The trunion axles 38 are spaced apart and are parallel to the axis 42 of the cylindrical outer drum 22. The trunions 24 ride beneath and to either side of the drum 22. The portion of the drum 22 between the rear tire 28 and the forward trunion tire 34 is composed of axially extending, closely-spaced wedge wires 44, best shown in FIG. 2, which form an outer screen 45. The cross-section of the wedge wires 44 is that of a truncated triangle 46, with the base 48 of the triangle forming the inside 50 of the drum 22. The truncated tops 52 of the triangles 46 are welded to circumferential bands 54. The bands reinforce and hold the wedge wires 44 in spaced relation around the drum 22. The gap 56 between adjacent wedge wires 44 will be selected based on the particulate matter encountered in the waste water to be filtered, in a preferred embodiment it is 0.010 inches.

Wedge wires 44 are preferred to ordinary screens in that they are less subject to becoming jammed with residue. The narrowest spacing in a filter mesh of circular wires is halfway through the filter. Thus, materials may become jammed halfway through in the pinch point between the circular wires. The wedge wire 44 have increased spacing between the wires in the direction of flow through the screen 45, so that any material which passes through the inside surface 50 of the screen 45 -will tend to pass completely through the screen 45.

The inner drum 58 is disposed within the outer drum 22, and is rigidly attached to the drum head 32 of the outer drum 22. The inner drum 58 is centered about the axis 42 of the outer drum 22, so that the outer drum 22 and the inner drum 58 are co-axial. The inner drum screen 58 is composed of axially extending wedge wires 60 which are spaced from one another a greater distance than the wedge wires of the outer drum 22. The wire-to-wire gap is, in a preferred embodiment, 0.060 inches. Waste water 62 which contains a broad range of particulate waste 64, for example, dirt and plant fines, is supplied to the interior 66 of the inner drum 58 adjacent to the common drum head 32 which encloses the first ends of the outer and inner drums.

The function of a wedge wire filter drum is optimized if the water is presented with low velocity as a smooth, uniform sheet of water. Because the apparatus 20 may be employed with flow volumes of 500 to over 1,500 gallons per minute, water ejected from a simple pipe is not sufficiently smooth in flow. The desired flow is accomplished by employing a waste water infeed 70 which conditions and smoothes the flow of waste water into the inner drum 58.

The water infeed 70 is positioned in the second, open, end 71 of the inner drum 58. The infeed 70, shown in FIGS. 3, 4, and 5, has a vertical conduit or column 72. At the bottom 73 of the column 72 is a circular inlet 74 with a standard pipe flange 76 which may be readily joined by bolting to the output of a waste water supply (not shown).

As best shown in FIG. 5, the overall shape of the interior of the column 72 is a truncated triangular, prismatic body 78 which tapers downwardly. The column 72 tapers in one plane only. The inlet 74 of the column 72 is formed in an outwardly facing first triangular side 80. An opposed triangular side 82 extends in parallel-spaced relation from the first side 80 and is connected thereto by rectangular side segments 84. The downward pointing apex 73 of the column 72 has a smooth, arcuate shaped portion 86 which is tangent to the circular inlet 74 and extends to join the rectangular sides 84. The rectangular sides 84 slope outwardly towards the top or base 88 of the inverted triangular portion 28 of the column 72 so that when water flows into the column 72 and up the body 78 toward the base 88, the cross-section of the column 72 increases. Thus, in accordance with simple fluid mechanics, the flow velocity decreases in proportion to the increase in cross-sectional area of the flow channel.

The top of the column 72 is joined to a horizontal conduit or trough 90 which has a horizontal bottom 92, two vertically extending sides 94 and a horizontal top 96. The trough 90 has a slightly smaller cross-section than the width of the top 88 of the column. A rectangular opening 98 is formed in the column and communicates with the trough. The lower edge of the opening 98 is spaced above the bottom 92 of the trough 90 and hence defines a weir 100. A down-turned lip 102 extends inwardly from the rectangular opening 98 and contributes to the smooth flow of water over the weir 100.

The weir 100 tends to ensure a uniform depth and flow of water into the trough 90. Employing the fluid dynamic principle that water seeks its own level, as long as the weir 100 extends in a horizontal plane, the amount of water flowing over each part of the weir 100 will tend to be the same.

The top 96 of the trough 90 has a clean-out access port 104. Normally, it will be covered with a cover (not shown). A first baffle 106 and a second baffle 107 extend between the sides of the trough 90 on either side of the clean-out port 104. The first baffle 106, which is proximal to the up-flow column weir 100, is broken into three spaced-apart vertically extending segments which define two slots 112 which further allow the passage of water. The baffle 106 is spaced from the bottom 92 of the trough to define a lower baffle gap 108 and is spaced from the top of the trough 96 to define an upper baffle gap 110. The first baffle 106 preferably has curved, downstream edges 114 to encourage a smooth flow of water past the baffle.

The second baffle 107 is extends between the trough sides 94. It has down-turned, downstream edges 116 and a single central slot 118. The upstream baffle 106 and the downstream baffle 107 perform functions similar to the weir 100 in that water builds up behind them and this tends to produce an even, side-to-side flow which completely fills the trough 90.

The sides 94 of the trough 90 taper inward away from the vertical column. This restriction of the trough cross-sectional area again aids in keeping the flow uniform across the trough. As the trough becomes narrower, the water flows slightly more rapidly or deeply. This, in combination with the smoothing baffles, overcomes the sidewall drag which would otherwise make the flow slower towards the sides 94.

From the trough, the water flows into a shallow tray 120 which is integrally formed with the trough 90. The tray has a bottom 122 and two open sides 124 which extend upwardly and radially outwardly from the bottom. The open sides 124 terminate in edges which extend in an axial direction within the inner drum and which are generally parallel to the cylindrical wall of the inner drum. The edges of the tray sides 124 define weirs 128. Down-turned lips 130 extend from the tray sides 124 and provide smooth curtains of water which impinge uniformly on the interior 66 of the inner screen drum 58. A cover 131 extends from the trough top 96 to the tray end 132.

The waste water infeed is supported at the tray end 132 by a tray support bushing 134 which rides on a bearing pin 136 which is mounted about the axis 42 of the outer 22 and inner drums 58 on the drum closure. The infeed tray and horizontal conduit thus remain fixed while the double drum screens 22, 58 rotate about them. This bearing pin 136 is important because it assures that the weirs 128 formed by the down-turned lips 130 remain horizontal and at the same level, so that the weir overflows are uniform.

When the waste water overflow streams hit the sides of the inner drum 58, waste materials 64 with a particle size greater than 0.060 inches will be caught on the surface of the inner screen wedge wires 60. Rotation of the screens tends to cause conglomeration of the particles 64, which adhere more or less strongly to each other. Auger means, such as helical flight screw auger 138 formed on the inside of the inner drum by an up-standing spiral strip 140 which affixed to the drum interior 66. Although the spiral strip 140 is shown as continuous, it can be formed of discontinuous elements.

As the drum rotates, the material that conglomerates is moved by the spiral towards the open, outlet end 71 of the inner drum 58. The inner drum 58 has circumferential reinforcing rings 142 which reinforce and are welded to the longitudinally extending wedge wires 60. These form the filter 144 of the inner drum 58. The waste water which passes through the inner drum 58, falls on to the surface of the outer drum 22. Materials 64 greater than 0.010 inches are caught on the screen 45 formed by the outer drum wedge wires 44. This material is similarly conglomerated into a more or less cohesive mass which is moved towards the front or second end of the outer drum 22 by up-standing elements 149 which form a second, outer drum, helical auger means 150.

The outer drum 22 has a cylindrical portion 146 adjacent to the second or open end 36 which is impervious to liquid flow therethrough. The open, second end 71 of the inner drum 58, is vertically disposed over the impervious portion 146 of the outer drum 22. Thus, waste 64 from the inner drum 58 falls to the impervious portion 146 of the outer drum where it joins the waste 64 from the outer drum 22 and is removed from the outer drum into a waste collection trough 148 by the outer drum auger 150.

The waste water 62 which passes though the outer drum 22 is collected in a waste water trough 152, best shown in FIG. 4, where it passes through a waste water collection trough drain 154 shown in FIG. 6. From the drain 154, the waste water may be pumped to disposal through an irrigation system or be used for additional washing.

The double drum waste water screen 20 has side covers 162 and a top cover 164 which completely enclose the sides 166 of the outer drum 22. The covers 162, 164, may be formed of stainless steel plate and may readily be removed for cleaning. They serve to prevent the escape of water spray from the double drum waste water screen 20. Further, the covers 162, 164 can prevent loss of heat or gain of heat if the waste water stream is at a temperature different from ambient.

It should be understood that where helical augers 138, 150 are shown as a continuous spiral, a discontinuous spiral could be used, or, two or more spirals might be used. Further, angled plates which approximate portions of a spiral could be used.

It should be further understood that the upflow waste water infeed 70 could be employed to improve the performance of a single drum waste water screen.

It should also be understood that whereas the drum screen 20 is shown to ride on trunions 24, at least one of which is driven, one or both ends of the drum 22 could be supported by central bearings disposed about the axis of the drums 22, 58, and the drum could be driven about the central bearings by a central drive shaft.

It should also be understood that wherein the waste water 62 is supplied from the same end of the drum as the conglomerated wastes are removed, the wastes could be introduced from an opening in the drum closure 32. This would supply waste water from the other end of the drum.

It should also be understood that the inner and outer drum could rotate in opposite directions, provided the augers were arranged likewise to spiral in an opposite sense.

It is understood that the invention is not confined to the particular construction and arrangement of parts herein illustrated and described, but embraces such modified forms thereof as come with the scope of the following claims.

It should also be understood that following claims are not limited by the theory of operation herein illustrated and described, but that such explanation is provided as an aid to understanding the disclosure. There may be other and more complete explanations now known or which may come to light with the passage of time.

I claim:

1. An apparatus for filtering particulate matter from water, the apparatus comprising:
   a) a frame;
   b) an outer drum rotatably mounted to the frame, the outer drum having portions defining a drum head and a generally cylindrical perforated screen extending from the drum head which allows the passage of water therethrough but which retains particulate matter above a first size;
   c) an inner drum mounted in cantilever supported engagement to the drum head inside of the outer drum and thus mounted to co-rotate with the outer drum, the inner drum having portions defining a generally cylindrical perforated screen which allows the passage of water therethrough but which retains particulate mater above a second size, wherein the second size is greater than the first size;
   d) means mounted on the interior of the outer drum for advancing particulate matter retained by the outer drum screen to a discharge opening of the outer drum;
   e) means mounted on the interior of the inner drum for advancing particulate matter retained by the inner drum screen to an inner drum discharge opening; and
   f) a conduit which discharges waste water containing particulate matter into the interior of the inner drum, whereby the water passes through the perforated screen of the inner drum and through the perforated screen of the outer drum, to yield a treated water flow which has reduced levels of particulate matter.

2. The apparatus of claim 1 wherein the inner drum perforated screen and the outer drum perforated screen are formed from wedge wire.

3. The apparatus of claim 1 wherein the conduit comprises:
   a) an upright conduit which extends generally vertically, the upright conduit having an inlet and an outlet above the inlet, and wherein the horizontal cross-sectional area of the upright conduit at the outlet is greater than the horizontal cross-sectional area of the upright conduit at the inlet, such that the velocity of waste water at the upright conduit outlet is less than the velocity of the waste water at the upright conduit inlet;
   b) a horizontal conduit which extends horizontally from the upright conduit into the interior drum;
   c) a lip located in the horizontal conduit, the lip forming a weir over which water flowing through the horizontal conduit must flow prior to being admitted into the inner drum.

4. The apparatus of claim 3 further comprising at least one baffle extending across the horizontal conduit for smoothing a flow of waste water in the horizontal conduit.

5. The apparatus of claim 3 wherein the horizontal conduit has a bottom and upwardly extending side walls, and wherein portions of the upright conduit define an edge spaced above the bottom of the horizontal conduit over which water flows into the horizontal conduit.

6. The apparatus of claim 3 wherein the horizontal conduit has a bottom and two side walls which extend upwardly from the bottom, and wherein the distance between the side walls is greater proximate the upright conduit than proximate the lip.

7. The apparatus of claim 1 wherein the outer drum has an open discharge end, and wherein the inner drum is shorter than the outer drum and has a discharge end which is spaced inwardly from the outer drum discharge end, and wherein the outer drum has circumferential portions which are impervious vertically spaced beneath the inner drum discharge end.

8. The apparatus of claim 1 wherein the screen of the outer drum is such as to retain materials greater than 0.010 inches, and the screen of the inner drum is such as to retain materials greater than 0.060 inches.

9. The apparatus of claim 1 wherein the conduit is supported on a bearing mounted on the drum head.

10. The apparatus of claim 9 wherein the bearing comprises a bearing pin mounted on the drum head and a support bushing mounted on the conduit.

11. An apparatus for filtering particulate matter from water, the apparatus comprising:
    a) a frame having a plurality of trunnions mounted thereto;
    b) an outer drum supported on the trunnions for rotation about a substantially horizontal axis, wherein the outer drum has portions defining a drum head and a generally cylindrical perforated screen extending from the drum head which allows the passage of water therethrough but which retains particulate matter above a first size;
    c) an inner drum mounted in cantilever supported engagement to the drum head coaxially within the outer drum to co-rotate with the outer drum, wherein the inner drum has portions defining a generally cylindrical perforated screen which allows the passage of water therethrough but which retains particulate mater above a second size, wherein the second size is greater than the first size;
    d) means mounted to the outer drum for advancing particulate matter retained by the outer drum screen to a discharge opening of the outer drum;
    e) means mounted on the inner drum for advancing particulate matter retained by the inner drum screen to an inner drum discharge opening; and
    f) a conduit which discharges waste water containing particulate matter into the interior of the inner drum, whereby the water passes through the perforated screen of the inner drum and through the perforated screen of the outer drum, to yield a treated water flow which has reduced levels of particulate matter.

* * * * *